United States Patent
Dobie et al.

(10) Patent No.: US 6,998,048 B1
(45) Date of Patent: Feb. 14, 2006

(54) METHOD AND APPARATUS FOR CLEANING EFFLUENT

(76) Inventors: Keith Dobie, 128 Central Ave., Humarock, MA (US) 02047; Philip B. Pedros, 49 Fairmont Ave., Wakefield, MA (US) 01880

(*) Notice: Subject to any disclaimer, the term of this patent is extended or adjusted under 35 U.S.C. 154(b) by 19 days.

(21) Appl. No.: 10/731,721

(22) Filed: Dec. 8, 2003

Related U.S. Application Data

(60) Provisional application No. 60/431,548, filed on Dec. 9, 2002.

(51) Int. Cl.
*C02F 3/30* (2006.01)
*C02F 3/06* (2006.01)

(52) U.S. Cl. .............. 210/605; 210/615; 210/617; 210/622; 210/259; 210/903

(58) Field of Classification Search ........... 210/605, 210/615, 616, 617, 618, 620, 621, 622, 252, 210/259, 903
See application file for complete search history.

(56) References Cited

U.S. PATENT DOCUMENTS

| | | | | |
|---|---|---|---|---|
| 4,465,594 A | * | 8/1984 | Laak | 210/151 |
| 4,824,563 A | * | 4/1989 | Iwahori et al. | 210/195.1 |
| 5,932,099 A | * | 8/1999 | Cote et al. | 210/605 |
| 5,961,830 A | * | 10/1999 | Barnett | 210/603 |
| 6,299,774 B1 | * | 10/2001 | Ainsworth et al. | 210/603 |
| 6,692,642 B2 | * | 2/2004 | Josse et al. | 210/605 |

FOREIGN PATENT DOCUMENTS

| | | | |
|---|---|---|---|
| JP | 7-171594 | * | 7/1995 |
| JP | 9-271796 | * | 10/1997 |
| JP | P2002-18468 | * | 1/2002 |

* cited by examiner

*Primary Examiner*—Fred G. Prince
(74) *Attorney, Agent, or Firm*—John P. McGonagle

(57) ABSTRACT

The process and apparatus of the present invention provides an anoxic pretreatment tank, a granular fixed film denitrification reactor and a membrane bioreactor. Raw waste flows into the anoxic pretreatment tank, through a denitrification filter and then to a membrane bioreactor for nitrification and micro filtering. Contents of the membrane bioreactor are periodically recycled to the anoxic tank and the denitrification filter for BOD reduction, denitrification and coarse filtration.

16 Claims, 2 Drawing Sheets

METHOD AND APPARATUS FOR CLEANING EFFLUENT

CROSS-REFERENCE TO RELATED APPLICATIONS

Applicants claim the priority benefits of U.S. Provisional Patent Application No. 60/431,548, filed Dec. 9, 2002.

BACKGROUND OF THE INVENTION

This invention relates to waste treatment systems, and in particular, to a method and apparatus for producing cleaner effluent.

A septic tank, also termed an anoxic tank, typically provides primary treatment for domestic wastewater where municipal treatment facilities are unavailable. In a conventionally operated septic tank, raw untreated sewage wastewater having a significant concentration of waste solids is introduced into the tank from an adjacent building. In the septic tank, solids separate from the liquid portion of the sewage. Solids having a lower density than the liquid move to the top of the liquid to form a scum layer, and solids having a higher density than the liquid sink to the bottom of the tank to form a sludge layer, resulting in a relatively clear liquid layer between the scum and the sludge. The liquid portion of the wastewater, which exits the discharge end of the tank by means of gravity, a pump, or a siphon, is the septic tank effluent. The quality of the septic tank effluent is generally measured by the biochemical oxygen demand (BOD), total suspended solids (TSS), and total nitrogen present in the effluent. The solids are periodically removed by having the tank pumped out and disposed in a facility specifically designed for solid disposal. Without secondary treatment, the septic tank effluent directly enters a drain field from which it is dispersed by percolation into the surrounding soil, with a certain amount of aerobic conversion taking place at this point. The effluent then migrates through the soil into the ground water, or sometimes into adjacent surface water, such as a stream or lake.

It has become more common now to provide secondary treatment of the septic tank effluent before disposing of the effluent in a drain field. Secondary treatment of septic tank effluent is typically an aerobic treatment. In addition to its reduction of BOD and TSS, the aerobic environment of secondary treatment causes bacteria to oxidize ammonia nitrogen to nitrate nitrogen, a process known as nitrification. However, even with conventional secondary treatment, the effluent may still have an unacceptable level of contamination.

SUMMARY OF THE INVENTION

The present invention provides a process and apparatus for producing a very high quality effluent from small on site waste treatment systems. The process and apparatus of the present invention involves an anoxic pretreatment tank, a granular fixed film denitrification reactor and a membrane bioreactor. Raw waste flows into the anoxic pretreatment tank, through the denitrification filter and then to the membrane bioreactor. Contents of the membrane bioreactor are periodically recycled to the anoxic tank and the denitrification filter for BOD reduction, denitrification and coarse filtration.

These together with other objects of the invention, along with various features of novelty which characterize the invention, are pointed out with particularity in this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
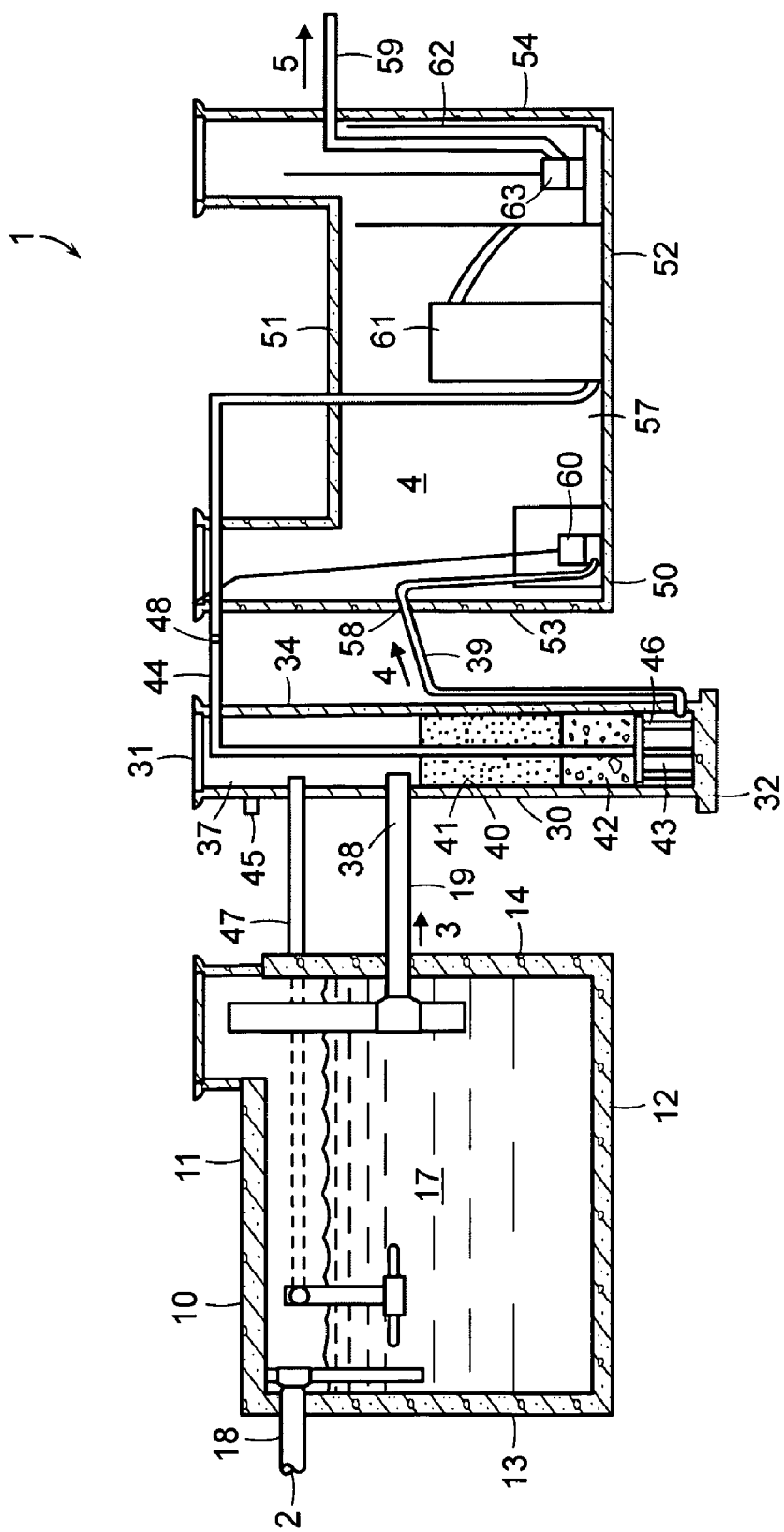
FIG. 1 is a diagrammic side view of a system constructed according to the invention.
Figure 2:
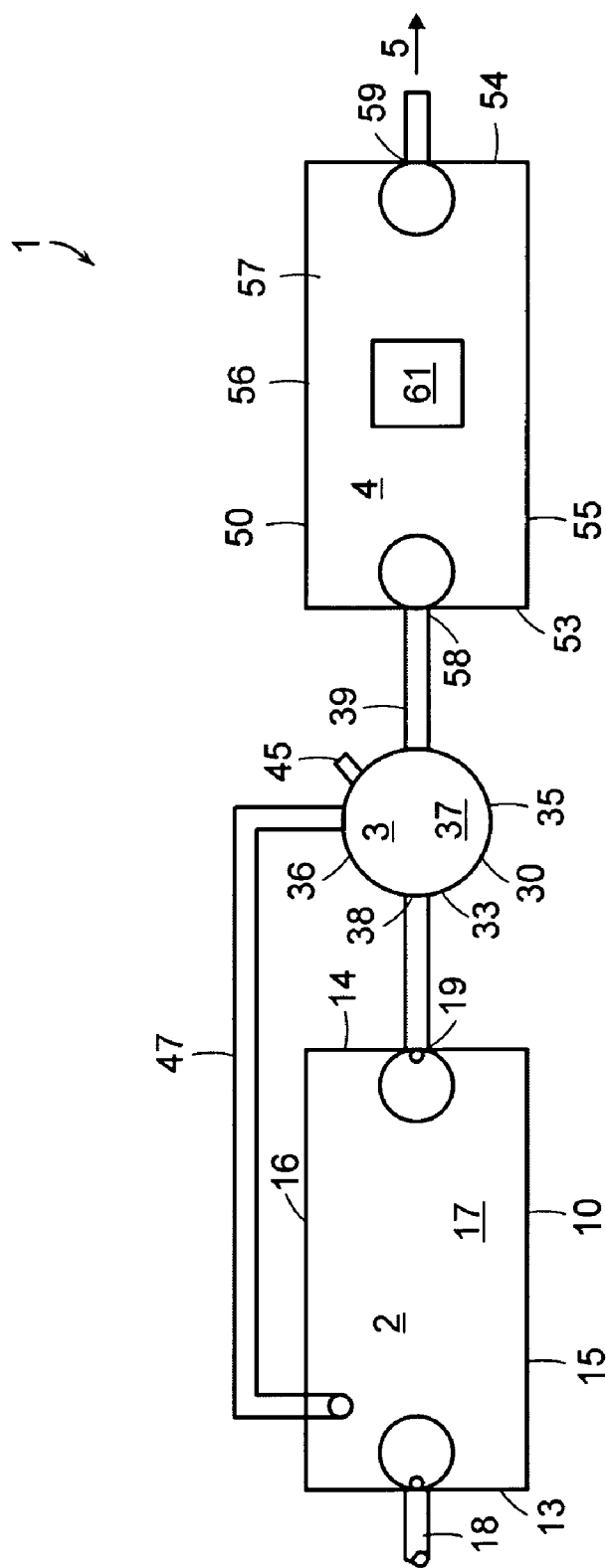
FIG. 2 is a top view of the system of FIG. 1.

Referring to the drawings in detail wherein like elements are indicated by like numerals, there is shown a waste treatment system 1 comprised of an anoxic pretreatment tank 10, a granular fixed film denitrification reactor 30 connected to said anoxic tank 10, and a membrane bioreactor 50 connected to said denitrification reactor 30. Raw waste 2 flows into said anoxic tank 10. Anoxic treated effluent 3 is passed from the anoxic tank 10 to the denitrification reactor 30. A denitrified effluent 4 is then passed from the denitrification reactor 30 to the membrane bioreactor 50. A filtered effluent 5 is then discharged from the membrane bioreactor 50 and made available for reuse. Provisions for backwashing and a recycling return flow are provided.

The anoxic tank 10 primarily provides sedimentation separation. However, there is a small amount of denitrification when effluent is returned. The denitrification reactor 30 primarily provides denitrification. However, some BOD is also removed. The membrane reactor 50 primarily provides mechanical filtration and nitrification. There is some BOD removal as well.

The anoxic pretreatment tank 10 provides settling and storage of primary solids and wasted secondary solids, equalization and storage of incoming flow and backwash/return flows, and some effluent denitrification. The anoxic tank 10 has a top 11, bottom 12, receiving side 13, discharge side 14, front 15 and rear 16, said top 11, bottom 12, sides 13, 14, front 15 and rear 16, defining a tank interior 17. The tank interior 17 receives waste from a building through a receiving waste pipe 18 protruding through the tank receiving side 13. The waste then separates into solids and effluent. The waste effluent 3 flows out through a discharge pipe 19 protruding through the tank discharge side 14.

The denitrification reactor 30 provides denitrification and filtration of the anoxic discharge effluent 3. The denitrification reactor 30 has a top 31, bottom 32, receiving side 33, discharge side 34, front 35 and rear 36, said top 31, bottom 32, sides 33, 34, front 35 and rear 36, defining a reactor interior 37. The reactor interior 37 has a filter 40 made up of two layers, an upper sand layer 41 and an adjacent, lower gravel layer 42 A sump 43 is formed beneath the filter 40 adjacent the interior bottom 32. The reactor interior 37 receives the anoxic waste effluent 3 from the anoxic discharge pipe 19 into a connecting reactor effluent input pipe 38 protruding through the reactor receiving side 33. The effluent input pipe 38 opens into the reactor interior 37 just above the reactor filter 40. The anoxic waste effluent flows through the filter layers and collects in the reactor sump 43. The resulting effluent in the sump 43 is substantially denitrified. The denitrified effluent 4 then flows by gravity out of the sump 43 through a discharge pipe 39 into the membrane bioreactor 50. A portion of the denitrified effluent 4 will be returned and recycled back to the denitrification reactor 30 and some may be returned and recycled back into the anoxic tank 10 through a recycle pipe 47 interconnecting the denitrification reactor 30 with the anoxic tank 10.

A backwash process air pipe 44 may be brought externally through the reactor discharge wall 34 near the reactor top 31 into the reactor interior 37. The air pipe 44 is brought down through the filter 40 to a junction 46 between the filter and the sump wherein the air pipe discharges air. The air rises through the filter 40 and vents out through a vent pipe 45 through one of the reactor walls near to the reactor top 31. The air pushes biomass and effluent back into the anoxic tank 10.

The membrane bioreactor 50 provides ultra or micro filtration of the denitrified effluent 4, retention of biomass for BOD removal and nitrification. The membrane bioreactor 50 has a top 51, bottom 52, receiving side 53, discharge side 54, front 55 and rear 56, said top 51, bottom 52, sides 53, 54, front 55 and rear 56, defining a bioreactor interior 57. The bioreactor interior 57 has a sump pump 60 adapted to return the nitrified contents of the denitrified effluent 4 from the reactor sump 43 through the bioreactor pipe 58 into the reactor return pipe 39 and into the denitrification reactor 30. The bioreactor interior 57 also contains a membrane pack 61 adapted to draw in the denitrified effluent 4 pooled within the bioreactor interior 57. The membrane pack 61 micro filters the effluent and discharges the micro filtered effluent 5 into an effluent pump basin 62 contained within the bioreactor interior 57. Alternate embodiments of the invention could have the pump basin external to the bioreactor 50. The pump basin 62 contains a sump pump 63 adapted to pump out the micro filtered effluent 5 through a bioreactor discharge pipe 59.

The denitrified effluent 4 passed from the denitrification reactor 30 to the membrane bioreactor 50 has a biomass content which settles to the membrane bioreactor bottom 52. The bioreactor biomass provides much of the nitrification and further reduces BOD.

The reactor air pipe 44 is brought into the bioreactor interior 57 and connected to the membrane pack 61 for a source of pressurized air. The air serves two purposes, clearing and cleaning the membrane pack 61, and secondly for process purposes. Air is needed for the nitrification process taking place within the bioreactor 50. A solenoid valve 48 directs air either into the denitrification reactor 30 via the air pipe 44 or into the membrane pack 61. The air supply into the membrane pack 61 may be steady or intermittent, preferably intermittent. Intermittent is measured in minutes rather than hours.

During a backwash cycle, air is run through the denitrification reactor 30 along with the sump pump 60 output. During a bioreactor 50 sump pump return to the denitrification reactor 30, there is little or no air run through the denitrification reactor 30.

It is understood that the above-described embodiment is merely illustrative of the application. Other embodiments may be readily devised by those skilled in the art which will embody the principles of the invention and fall within the spirit and scope thereof.

We claim:

1. A waste treatment system, comprising:
   an anoxic pretreatment tank adapted to receive raw untreated sewage having a mixture of solids and liquids, wherein said sewage within said anoxic tank separates into a sludge layer, a scum layer, and a liquid effluent layer between said sludge layer and said scum layer, wherein said anoxic tank is adapted to provide some effluent denitrification;
   a granular fixed film denitrification reactor connected to said anoxic tank, said denitrification reactor being adapted to denitrify a liquid effluent and provide some biochemical oxygen demand (BOD) removal from said effluent; and
   a membrane bioreactor connected to said denitrification reactor, said membrane bioreactor adapted to provide ultra and micro filtration of a denitrified effluent, retain biomass for BOD removal and nitrification;
   wherein said anoxic tank effluent is passed from the anoxic tank to the denitrification reactor for denitrification, wherein a denitrified effluent is passed from the denitrification reactor to the membrane bioreactor for filtration.

2. A waste treatment system as recited in claim 1, wherein:
   said anoxic tank has a top, a bottom, a receiving side, a discharge side, a front and a rear, said top, bottom, sides, front and rear, defining a tank interior, said tank interior receiving said sewage through a receiving waste pipe protruding through the tank receiving side, wherein said effluent is discharged from said tank interior through a discharge pipe protruding through the tank discharge side.

3. A waste treatment system as recited in claim 2, wherein:
   said denitrification reactor has a top, a bottom, a receiving side, a discharge side, a front and a rear, said top, bottom, sides, front and rear defining a reactor interior, said reactor interior having a filter and a sump beneath said filter adjacent the interior bottom, said reactor interior receiving said anoxic effluent from said anoxic tank from the anoxic discharge pipe into a connecting reactor effluent input pipe protruding through the reactor receiving side, said effluent input pipe opening into the reactor interior above the reactor filter, said anoxic effluent flowing through the filter and collecting in the reactor sump, said filtered effluent being substantially denitrified, said denitrified effluent flowing by gravity out of the sump through a discharge pipe into the membrane bioreactor.

4. A waste treatment system as recited in claim 3, wherein:
   said membrane bioreactor has a top, a bottom, a receiving side, a discharge side, a front and a rear, said top, bottom, sides, front and rear defining a bioreactor interior, said bioreactor interior receiving said denitrified effluent from the reactor discharge pipe through a bioreactor pipe protruding through said bioreactor receiving side, said bioreactor interior having a sump pump adapted to return a nitrified content of the denitrified effluent from the reactor sump through the bioreactor pipe into a reactor return pipe and into the denitrification reactor, said bioreactor interior containing a membrane pack adapted to draw in the denitrified effluent pooled within the bioreactor interior, said membrane pack adapted to micro filter the denitrified effluent and discharge the filtered effluent into a filtered effluent pump basin, said pump basin containing a sump pump adapted to pump out the micro filtered effluent through a bioreactor discharge pipe.

5. A waste treatment system as recited in claim 4, wherein:
   a biomass content from the denitrified effluent passed from the denitrification reactor to the membrane bioreactor settles to the membrane bioreactor bottom and is adapted to provide nitrification and further reduce BOD in the denitrified effluent.

6. A waste treatment system as recited in claim 5, further comprising:
a backwash process air pipe brought externally through the reactor discharge wall near the reactor top into the reactor interior, said air pipe being brought down through the filter to a junction between the filter and the sump wherein the air pipe discharges air, said air rising through the filter and venting out through a vent pipe through one of the reactor walls near to the reactor top, said air adapted to pushing biomass and effluent back into the anoxic tank.

7. A waste treatment system as recited in claim 6, further comprising:
a branch from the reactor air pipe extending into the bioreactor interior and connected to the membrane pack for a source of pressurized air, said pressurized air adapted for clearing and cleaning the membrane pack and secondly for nitrification processing within the bioreactor;
a valve in the air pipe adapted to direct air either into the dentrification reactor via the air pipe or into the membrane pack.

8. A waste treatment system as recited in claim 7, wherein:
said reactor filter has two layers, an upper sand layer and an adjacent, lower gravel layer.

9. A waste treatment system as recited in claim 8, further comprising:
a recycle pipe connecting the denitrification reactor with the anoxic tank wherein a portion of the nitrified effluent is returned and recycled back to the denitrification reactor and a portion returned and recycled back into the anoxic tank.

10. A waste treatment system as recited in claim 9, wherein:
said bioreactor pump basin is external to the bioreactor.

11. A waste treatment process comprising the steps:
bringing raw waste untreated sewage having a mixture of solids and liquids into an anoxic tank;
separating said untreated sewage into a sludge layer, a scum layer, and a liquid effluent layer between said sludge layer and said scum layer;
passing said liquid effluent into a denitrification reactor;
filtering and denitrifying said liquid effluent to form a denitrified effluent;
gathering said denitrified effluent into a sump;
discharging said denitrified effluent into a membrane bioreactor;
pooling said denitrified effluent within said bioreactor;
nitrifying said denitrified effluent;
drawing said nitrified effluent through a membrane pack and micro filtering said nitrified effluent to form a micro filtered effluent; and
discharging said micro filtered effluent into a pump basin.

12. A waste treatment process as recited in claim 11, further comprising the step:
returning a portion of the nitrified effluent within said bioreactor back to the dentrification reactor.

13. A waste treatment process as recited in claim 12, further comprising the step:
bringing pressurized air into said reactor and through said filtering liquid effluent.

14. A waste treatment process as recited in claim 13, further comprising the step:
bringing pressurized air through said membrane pack.

15. A waste treatment process as recited in claim 14, further comprising the step:
returning and recycling a portion of the nitrified effluent back into the denitrification reactor.

16. A waste treatment process as recited in claim 15, further comprising the step:
returning and recycling a portion of the nitrified effluent back into the anoxic tank.

* * * * *